United States Patent

Heiber et al.

[11] Patent Number: 5,169,651
[45] Date of Patent: Dec. 8, 1992

[54] PACKAGE SCORING APPARATUS

[75] Inventors: Wolfgang Heiber; Julius Schroeder-Frerkes, both of Ekrath, Fed. Rep. of Germany

[73] Assignee: Heiber & Schroeder GmbH, Fed. Rep. of Germany

[21] Appl. No.: 703,176

[22] Filed: May 20, 1991

[51] Int. Cl.⁵ .................... B29C 59/04; B31B 1/25
[52] U.S. Cl. .................. 425/335; 264/284; 425/363; 425/385; 493/403
[58] Field of Search .......... 83/879, 882, 883, 884; 264/284; 493/403; 425/304, 335, 363, 374, 385

[56] References Cited

U.S. PATENT DOCUMENTS

| | | | |
|---|---|---|---|
| 2,728,950 | 1/1956 | Annesser | 264/284 |
| 2,941,560 | 6/1960 | McCaffery | 83/882 |
| 3,292,513 | 12/1966 | Palmer | 493/354 |
| 3,320,225 | 5/1967 | Bradbury | 264/284 |
| 3,379,814 | 4/1968 | Bracey, Jr. | 264/322 |
| 3,704,975 | 12/1972 | Bunting, Jr. et al. | 425/385 |
| 3,706,251 | 12/1972 | Wheeler et al. | 83/882 |
| 4,061,457 | 12/1977 | Butler | 425/385 |
| 4,080,878 | 3/1978 | Gallagher et al. | 425/363 |
| 4,213,550 | 7/1980 | Bonaddio | 83/884 |
| 4,946,430 | 8/1990 | Kohmann | 493/58 |

Primary Examiner—Jay H. Woo
Assistant Examiner—James P. Mackey
Attorney, Agent, or Firm—Hill, Van Santen, Steadman & Simpson

[57] ABSTRACT

A method and apparatus for forming a fold line in a sheet of semi-rigid thermoplastic material including supporting the sheet on cylindrical rollers as the sheet is drawn forwardly along the creasing path through a creasing zone and applying a sequence of heated creasing rollers with each roller penetrating the surface of the sheet an increasing amount and immediately following the creasing by a caliper roller having shoulders for flattening the shoulders in the plastic formed beside the crease.

15 Claims, 2 Drawing Sheets

PACKAGE SCORING APPARATUS

BACKGROUND OF THE INVENTION

The present invention relates to improvements in methods and apparatus for scoring or forming grooves in a sheet of thermoplastic material which must be folded at the groove such as to form the corner window of a carton.

In the manufacture of certain cartons, the cartons are made of boxboard and have a window therein to view the carton contents which is a desirable structure for merchandising. While a single transparent window panel may be included in the carton, it is far more desirable to have a double paneled window corner so that two sides of the contents may be observed through the walls of the box providing an improved three dimensional effect for the customer. In the manufacture of such boxes, the window panel is formed of a clear or transparent thermoplastic such as PVC which is cemented to the boxboard walls of the box and folded. If the transparent PVC is folded without preparation, the plastic material in the region of the fold line tends to fold very unevenly and curve detracting from the appearance and strength of the box and providing a box which is more difficult to handle. Further, in some cases in folding of the PVC, the plastic material in the region of the fold line tends to turn white upon bending. Various methods have been proposed for preparing the clear window material such as by prescoring the material which is discussed in U.S. Pat. No. 3,379,814. Another arrangement has been proposed in U.S. Pat. No. 3,292,513 which also involves scoring the material in a cold scoring process. U.S. Pat. No. 4,946,430 discloses a further method wherein the material is heated but the heat is applied radiantly with the entire surface heated in the area of the scoring lengthwise of the travel of the path of a sheet with the scoring of the sheet after the sheet has been adequately heated over an area. In the latter arrangement, difficulty will be encountered in limiting the heat to a narrow area so that unnecessary heat energy is required plus the material is affected by heating beyond the sides of the score line.

In the formation of score lines in thermoplastic sheets, it is essential that the depth and width of the score line be positively controlled. If the score line is made too deep, the operation can penetrate the plastic so that an opening results in the side of the box which is formed by folding the window material. If the depth of the score line is inadequate, the plastic window panel will not fold as it should. Also, if the score line is applied nonuniformly in depth, the transparent window panel will not fold uniformly. Also, if too much heat is applied over a width beyond the limits of the score line, the plastic at the side of the score line is adversely affected making it difficult to control the exact dimensions of the score line.

In the formation of score lines or fold lines by heat, the displacement of the material in the formation of the score lines creates a shoulder beside the score line. This shoulder detracts from the appearance of the plastic and has not been avoided by arrangements heretofore disclosed.

These and other substantial efforts toward providing score lines indicate difficulties encountered in the prior art.

FEATURES OF THE INVENTION

An object of the present invention is to provide a mechanism and method for forming score lines in thermoplastic sheets which are to be folded along the score lines wherein difficulties in mechanisms and methods proposed by the prior art are avoided, such as excessive heating of the score line and lack of control over the score line which is created.

A further object of the invention is to provide an apparatus wherein a score line is formed in thermoplastic material with the dimensions of the score line being accurately controllable to provide for an improved foldable transparent panel.

A still further object of the invention is to provide an arrangement for forming a score line wherein the application of excessive amounts of heat to the score line are avoided and the line is formed by careful application of sequential and sequential scoring forces and pressures.

In accordance with the features of the invention, a score line is formed by the application of heat to a thermoplastic sheet simultaneously with the mechanical application of a scoring force. This force and the application of heat are gradually applied so that only sufficient heat is transmitted to the plastic adequate for forming the score line and the transmission of heat to the lateral sides of the score line outwardly therefrom are avoided or minimized. This is accomplished by the application of a series of tools preferably in the form of rotary V-shaped rollers which themselves are heated so that they form the dual function of applying mechanical pressure to form the score line and transmitting heat to the plastic in the very limited location of the groove score line.

A further feature is the application of a last force and heat to the plastic by a shouldered scoring roller which flattens the plastic raised by the formation of the score line. This presents a more attractive appearing sheet and one which has greater uniformity in strength and foldability.

Other objects, features and advantages will become more apparent with the teaching of the principles of the invention in connection with the disclosure of the preferred embodiments thereof in the specification, claims and drawings in which:

BRIEF DESCRIPTION OF THE DRAWINGS

FIG. 6 is an enlarged vertical sectional view with parts broken away taken substantially along line VI—VI of

PREFERRED EMBODIMENTS OF THE INVENTION

Figure 1:
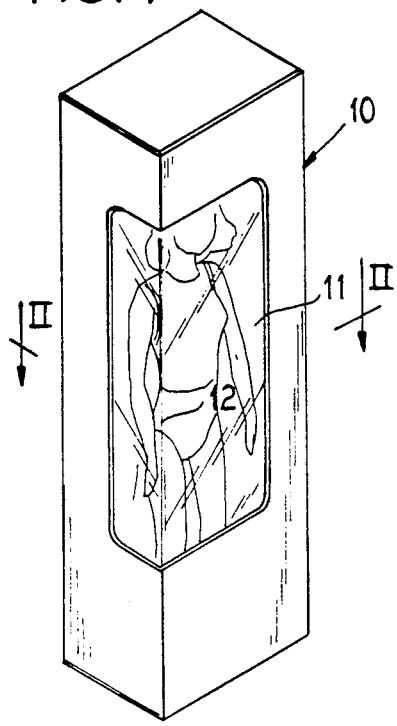
FIG. 1 is a perspective view of a finished carton having a window panel which is creased in accordance with the principles of the present invention.

FIG. 1 illustrates a completed carton 10 which is used in merchandising having a clear window panel 11 therein. The window panel will extend over two walls of the carton and to fold the panel 11, it is folded about a vertical fold line 12.

Figure 2:
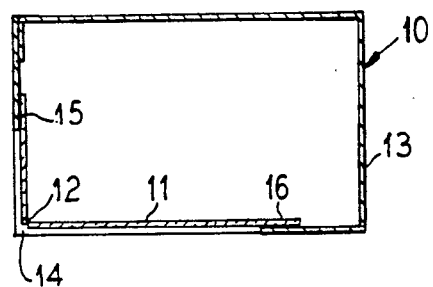
FIG. 2 is a horizontal sectional view taken substantially along II—II of FIG. 1.

As illustrated in FIG. 2, the principal walls of the box are formed of boxboard 13 which are scored prior to folding and normally the box is folded into shape before the merchandise contents are inserted therein. Prior to folding, the window panel 11 will be cemented at 15 and 16 to the inner surfaces of walls of the box so that when the corners of the box are formed, the window panel 11 will be folded at 12. A folding groove 14 is shown on the outer surface of the window panel which enhances the foldability of the panel and prevents the plastic from folding unevenly and having a white line at the location of the fold. The groove 14 for optimum conditions should be uniform in depth throughout the vertical length of the window panel 11 and formed of an optimum depth not of nonuniform depth over the length. If nonuniform depth were present, varying resistances to folding would occur along the length of the panel and the risk of excessive depth would weaken the plastic so that the plastic might separate and leak at the corner and in accordance with the principles of the invention, the groove 14 is formed by a sequence of creasing steps each relatively gentle in nature as contrasted with procedures which form the crease in one operation. Also, the crease is formed by the application of heat to the thermoplastic only at the location of the groove and not such that the heat is applied extensively to the sides of the groove which can adversely affect the plastic at the groove sides beyond the location where the groove is needed.

Figure 3:
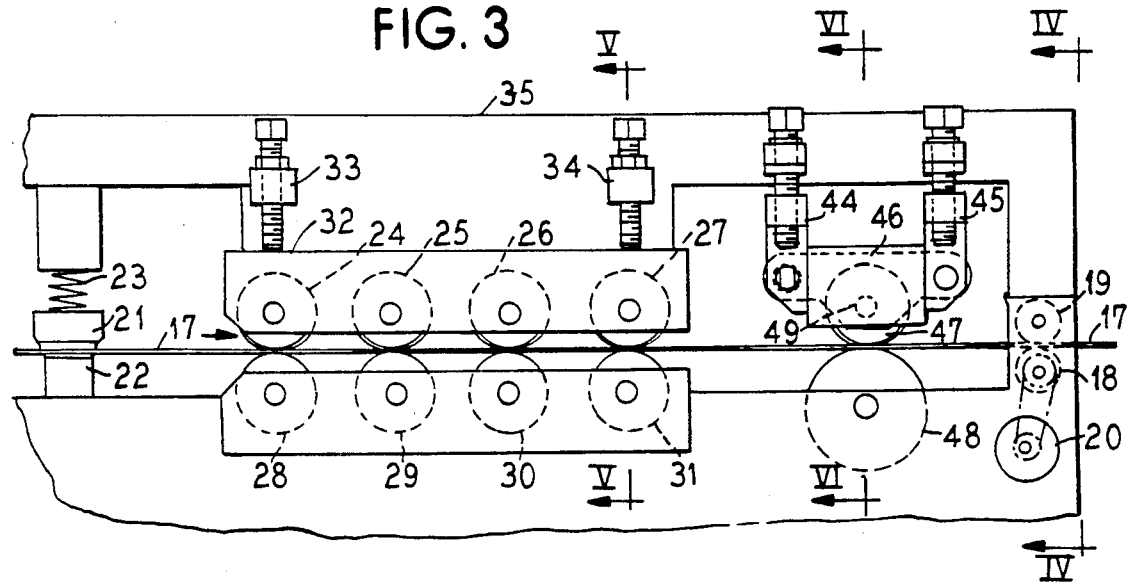
FIG. 3 is a somewhat schematic side elevational view illustrating the apparatus for forming a folding groove in a sheet of clear thermoplastic.

A preferred form of apparatus is illustrated in FIG. 3 wherein a continuous sheet of plastic 17 is drawn through a creasing zone along the creasing path. This creates relative movement between the creasing or scoring tools and the sheet and causes a uniform application of heat as the sheet is moved uniformly in speed. While varying speeds of movement may be employed which may vary with the temperature at which heat is imparted to the plastic and also with the thickness and nature of the plastic, a sheet travel speed in the range of 1 to 70 meters per minute has been found to be desirable. A preferable depth of crease which is applied is in the range of 60% to 70% of the thickness of the plastic sheet 17.

The sheet is drawn forward at the controlled speed by pinch rollers 18 and 19. The lower pinch roller 18 is driven by suitable belt means from a drive source 20 and preferably has a frictional surface such as of rubber. The draw roller 18 is driven at a uniform predetermined speed which is a function of the nature and thickness of the plastic sheet 17 and the heat imparted by the creasing rollers as will be described.

To better control the travel of the plastic sheet, braking pads 21 and 22 are positioned upstream of the creasing means. These pads apply a frictional sliding resistance to the sheet and, of course, are made of very smooth preferably soft material so as to avoid scoring or marking the sheet. The pads are shown with a spring 23 applying pressure to the upper pad 21. While speed control drive rollers may be used at this location, other rollers may be used to draw a supply of material off a supply roll and the braking pads have been found to providing desirable control to the travel of the sheet.

As the sheet is drawn forwardly through the creasing zone, it is grooved by a series of creasing rollers 24, 25, 26 and 27. The sheet is supported in locations opposite the creasing rollers by support members in the form of cylindrical anvil rollers 28, 29, 30 and 31 which are not heated to avoid heating the side of the sheet opposed to the creasing roller.

Figure 5:
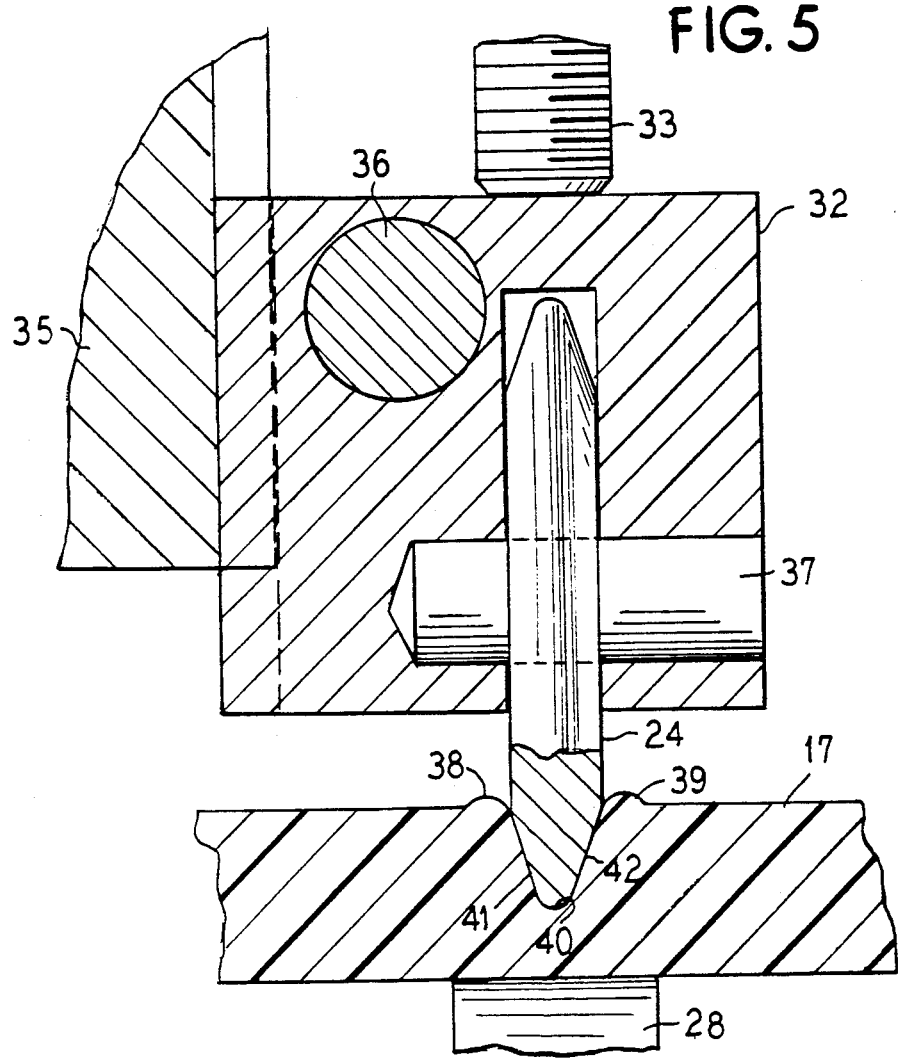
FIG. 5 is an enlarged vertical sectional view taken substantially along line V—V of FIG. 3.

The creasing rollers are each rotatably supported on a support block 32, FIGS. 3 and 5 to be freely rotatable supported on shafts 37. While the creasing rollers may be driven, preferably they are freely rotating and have a V-shaped outer edge with the sides of the V shown at 41 and 42 in FIG. 5. Each of the rollers are constructed similarly so that only one need be described.

The block 32 which supports the rollers is vertically movably mounted so as to regulate the penetration of the creasing rollers into the sheet and for this purpose, adjustable backing supports 33 and 34 are mounted on a frame 35. The cylindrical rollers 28, 29, 30 and 31 are similarly freely rotatable supported on suitable shafts in the frame.

The creasing rollers are mounted so that their axis as arranged at each succeeding creasing roller will penetrate slightly more deeply into the groove than the previous one. The rollers receive heat from a heating element 36 mounted in a block 32 so that each roller softens the thermoplastic as it engages it to be able to displace the thermoplastic and form the groove.

Figure 4:
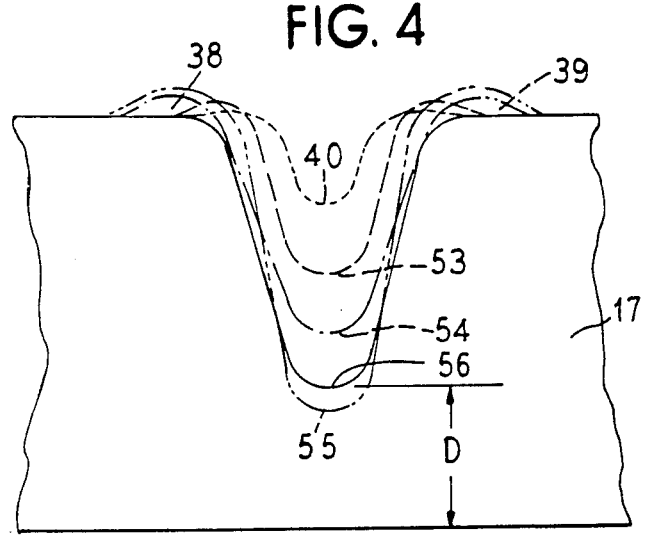
FIG. 4 is a schematic substantially enlarged sectional view taken generally in the direction of lines IV—IV of FIG. 3 illustrating the sequential depths of penetration in the formation of the groove in the material.

FIG. 4 is an illustration showing how each successive roller penetrates more deeply into the plastic. Roller 24 causes the penetration shown at 40 in FIG. 4. The next roller 25 will penetrate slightly more deeply, causing the penetration shown at 53. The next roller 26 penetrates to location 54 and the last creasing roller 27 penetrates to the location 55.

Since the only heat that the plastic receives is that which is caused by convection from the sides of the roller, the plastic of the groove is displaced only slightly with each successive roller. As the plastic is displaced, it tends to built up shoulders as shown in FIG. 5 at 38 and 39. These shoulders are undesirable and an arrangement is provided for the removal of the shoulders and the flattening of the plastic so that the sides of the groove lie in the plane of the upper surface of the plastic sheet.

Figure 6:
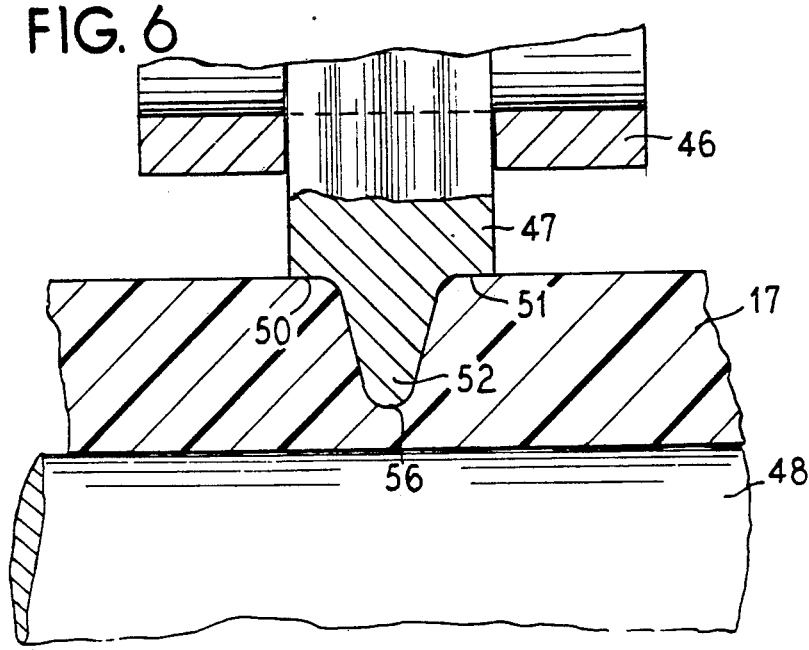

For this purpose, a caliper roller 47 is provided following the creasing rollers. The caliper roller, FIGS. 3 and 6, is rotatably mounted for free rotation on an axis 49 in a support block 46. The location and depth of penetration of the caliper roller is varied by support of the block 46 carrying the roller by adjustable bolts 44 and 45 carried on the frame. The sheet is supported opposite the caliper roller by a free rotating cylinder 48 which may extend broadly across the sheet for additional sheet support, or the roller may be shorter to provide support only opposite the caliper roller.

The caliper roller penetrates the sheet to a depth less than the final creasing roller as shown by the depth 56 which represents the penetration of the caliper roller. The solid line 56 also shows that the shoulders 38 and 39 have been removed and flattened. The caliper roller 47 is heated by a heating element shown schematically at 43 in FIG. 3.

The caliper roller as shown in FIG. 3 has a V-shaped point 52 and has laterally extending side shoulders 50 and 51. These shoulders flatten the plastic and as the plastic is softened due to the heat of the caliper roller 47, the plastic of the groove is reformed so that the eventual groove has the depth to point 56.

Thus, with the succession of localized heating which is applied by each individual creasing roller 24, 25, 26 and 27 and this being followed by the caliper roller 47, the plastic has been heated only to a slight depth beside the groove and the groove perfectly formed. The sheet 17 is then ready for folding to form a window of a box such as illustrated in FIGS. 1 and 2.

In operation, a continual length of thermoplastic sheet 17 is fed through the creasing zone where the sheet is first acted on by the series of creasing rollers 24, 25, 26 and 27 to form the succession of progressively deeper grooves shown at 40, 53, 54 and 55 in FIG. 4. The depth of the groove depends on the thickness of the film sheet which is normally on the order of between 100 and 400 micros. The crease is normally about 60% to 70% of the thickness of the sheet leaving an uncreased portion shown at D in FIG. 4 of 30% to 40% of the sheet thickness. The creasing rollers are placed in sequence preferably of uniform distance between each other preferably as close as practical. The caliper roller is also placed as close as practical beyond the last creasing roller, preferably not more than 100 mm. The sheet has sufficient heat beside the gap so that the caliper roller performs its function of removing the shoulders without the addition of further heat utilizing the still softened condition of the plastic in the groove. The pressure range that is chosen for the rollers to press against the plastic will be determined by use but the range of pressure for the four creasing rollers is in the range 100 to 200 kg. By applying the final caliper roller without additional heat, a definite groove size is established which is uniform as the sheet progresses.

Thus, it will be seen that there has been provided an improved method and mechanism for providing a crease in a sheet or panel of transparent plastic which is to be folded. The provisions of the invention obviate disadvantages of the prior art and provide an improved reliable and inexpensive creasing apparatus which is capable of high production operating speeds.

WE CLAIM AS OUR INVENTION:

1. A mechanism for forming a fold line in a sheet of semi-rigid thermoplastic material comprising in combination:
    a support means for supporting a semi-rigid plastic sheet in travel along a creasing path through a creasing zone;
    a series of creasing rollers rotatably mounted in said zone positioned to penetrate a surface of the sheet so that plastic of said sheet is mechanically displaced with said rollers located in sequence each to penetrate a same folding groove;
    means for heating said creasing rollers to a plasticity stage of the plastic sheet;
    a rotatably mounted heated caliper roller positioned in said zone downstream from the creasing rollers to penetrate the groove and having shoulders engaging the plastic of the sheet beside the groove leveling the plastic displaced by the creasing rollers;
    and drive means for drawing the sheet forwardly through the creasing zone along the creasing path.

2. A mechanism for forming a fold line in a sheet of semi-rigid thermoplastic material constructed in accordance with claim 1:
    wherein four creasing rollers are located in sequence along said creasing path.

3. A mechanism for forming a fold line in a sheet of semi-rigid thermoplastic material constructed in accordance with claim 1:
    wherein each successive creasing roller is positioned to sequentially penetrate the sheet an increasing amount.

4. A mechanism for forming a fold line in a sheet of semi-rigid thermoplastic material constructed in accordance with claim 1:
    wherein said caliper roller is positioned to penetrate the sheet to a depth less than a last of the creasing rollers.

5. A mechanism for forming a fold line in a sheet of semi-rigid thermoplastic material constructed in accordance with claim 1:
    wherein the heating means has a capacity to heat the creasing rollers to a temperature with upper and lower limits of 40° and 150° C.

6. A mechanism for forming a fold line in a sheet of semi-rigid thermoplastic material constructed in accordance with claim 1:
    wherein the support means is in the form of cylindrical anvil rollers each located at a location of a creasing roller so that an anvil roller supports the sheet opposed to the location of the creasing rollers.

7. A mechanism for forming a fold line in a sheet of semi-rigid thermoplastic material constructed in accordance with claim 6:
    wherein said anvil rollers are unheated to avoid heating the side of the sheet opposed to the creasing rollers.

8. A mechanism for forming a fold line in a sheet of semi-rigid thermoplastic material constructed in accordance with claim 5:
    including a heating means for the caliper roller having a capacity for heating the caliper roller between an upper and lower limit of 40° and 150° C.

9. A mechanism for forming a fold line in a sheet of semi-rigid thermoplastic material constructed in accordance with claim 1:
    including a support for said creasing rollers having a range of support force applied to the creasing rollers in the range of 100–200 kg.

10. A mechanism for forming a fold line in a sheet of semi-rigid thermoplastic material constructed in accordance with claim 1:
    wherein each successive creasing roller is spaced from the preceding creasing roller a distance not more than 100 mm.

11. A mechanism for forming a fold line in a sheet of semi-rigid thermoplastic material constructed in accordance with claim 1:
    wherein the caliper roller is spaced downstream from the last creasing roller a distance not more than 200 mm.

12. A mechanism for forming a fold line in a sheet of semi-rigid thermoplastic material constructed in accordance with claim 1:
    wherein said drive means has a capacity of moving the sheet through the creasing zone at a speed in the range of a lower limit and an upper limit of 1 meter and 70 meters per minute.

13. A mechanism for forming a fold line in a sheet of semi-rigid thermoplastic material constructed in accordance with claim 1:

wherein said creasing rollers and caliper roller are positioned relative to said support means so that the depth of a crease in the sheet formed by said creasing rollers and said caliper roller is in the range of 60% to 70% of the sheet thickness.

14. A mechanism for forming a fold line in a sheet of semi-rigid thermoplastic material constructed in accordance with claim 1:
   wherein each successive creasing roller has a V-shaped penetrating edge.

15. A mechanism for forming a fold line in a sheet of semi-rigid thermoplastic material comprising in combination:

a support means for supporting a semi-rigid plastic sheet in travel through a creasing zone along a creasing path;

a plurality of sequential heated creasing elements positioned in said zone to penetrate a surface of the sheet and form a continuous folding groove so that plastic of said sheet is mechanically laterally displaced;

means causing relative movement between the sheet and the creasing elements; and means immediately following the creasing elements in said path for applying a flattening force at the sides of said groove removing shoulders formed by displacement of plastic material in the formation of said groove by said creasing elements.

* * * * *